United States Patent

[11] 3,577,189

[72] Inventors John Cocke
Mount Kisco;
Brian Randell, Pleasantville; Herbert Schorr, Briar Cliff, N.Y.; Edward H. Sussenguth, Los Altos, Calif.
[21] Appl. No. 791,255
[22] Filed Jan. 15, 1969
[45] Patented May 4, 1971
[73] Assignee International Business Machines Corporation
Armonk, N.Y.

[54] APPARATUS AND METHOD IN A DIGITAL COMPUTER FOR ALLOWING IMPROVED PROGRAM BRANCHING WITH BRANCH ANTICIPATION REDUCTION OF THE NUMBER OF BRANCHES, AND REDUCTION OF BRANCH DELAYS
13 Claims, 14 Drawing Figs.

[52] U.S. Cl. .......... 340/172.5
[51] Int. Cl. .......... G06f 9/00, G06f 9/16
[50] Field of Search .......... 340/172.5; 235/157

[56] References Cited
UNITED STATES PATENTS

| | | | |
|---|---|---|---|
| 3,297,998 | 1/1967 | Klein .......... | 340/172.5 |
| 3,400,371 | 9/1968 | Amdahl et al. .......... | 340/172.5 |
| 3,408,630 | 10/1968 | Packard et al. .......... | 340/172.5 |
| 3,418,638 | 12/1968 | Anderson et al. .......... | 340/172.5 |

*Primary Examiner*—Gareth D. Shaw
*Attorneys*—Hanifin and Jancin and Peter L. Leal

ABSTRACT: Apparatus and a method in a digital computer is disclosed for allowing improved program branching from a first instruction sequence to a second instruction sequence. Said apparatus includes means for decoding a branch instruction in said first sequence; means for determining parameters which are to enter into a condition determination, the resolution of which defines whether or not the branch is to be made, means for detecting a specific type instruction in said first sequence subsequent to said branch instruction, said specific type instruction indicative of the point in the first instruction sequence at which the branch is to be made; and means responsive to said detection for ordering instructions from said second instruction sequence to be processed subsequent to the processing of said specific type instruction.

*INVENTORS*
JOHN COCKE
BRIAN RANDELL
HERBERT SCHORR
EDWARD H. SUSSENGUTH
BY *Peter R. Leal*
AGENT

PATENTED MAY 4 1971 3,577,189

| CYCLE / ROW | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 4 | OPα4 | OPα5 | OPα6 | OPα7 | EXIT | OPα8 | OPα9 | OPα10 | OPβ1# | OPβ2 | OPβ3 | OPβ4 | OPβ5 | OPβ6 |
| 3 | B | OPα4 | OPα5 | OPα6 | OPα7 | EXIT | OPα8 | OPα9 | OPα10 | OPβ1# | OPβ2 | OPβ3 | OPβ4 | OPβ5 |
| 2 | OPα3 | B | OPα4 | OPα5 | OPα6 | OPα7 | EXIT | OPα8 | OPα9 | OPα10 | OPβ1# | OPβ2 | OPβ3 | OPβ4 |
| 1 | OPα2 | OPα3 | B | OPα4 | OPα5 | OPα6 | OPα7 | EXIT | OPα8 | OPα9 | OPα10 | OPβ1# | OPβ2 | OPβ3 |
| 0 | OPα1 | OPα2 | OPα3 | B | OPα4 | OPα5 | OPα6 | OPα7 | EXIT | OPα8 | OPα9 | OPα10 | OPβ1# | OPβ2 |

FIG. 5A

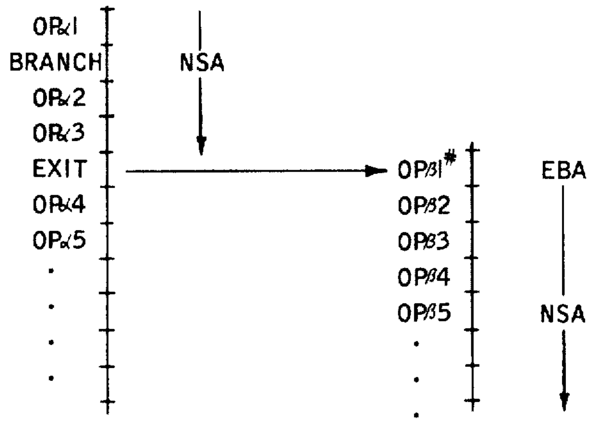

FIG. 6

| CYCLE / ROW | 1 | 2 | 3 | 4 | 5 | 6 | 7 | 8 |
|---|---|---|---|---|---|---|---|---|
| 4 | EXIT | OPα4 | - | OPβ1# | OPβ2 | OPβ3 | OPβ4 | OPβ5 |
| 3 | OPα3 | EXIT | OPα4 | - | OPβ1# | OPβ2 | OPβ3 | OPβ4 |
| 2 | OPα2 | OPα3 | EXIT | OPα4 | - | OPβ1# | OPβ2 | OPβ3 |
| 1 | B | OPα2 | OPα3 | EXIT | OPα4 | - | OPβ1# | OPβ2 |
| 0 | OPα1 | B | OPα2 | OPα3 | EXIT | OPα4 | - | OPβ1# |

FIG. 6A

| ROW \ CYCLE | 1 | 2 | 3 | 4 | 5 | 6 | 7 | 8 | 9 | 10 |
|---|---|---|---|---|---|---|---|---|---|---|
| 4 | B2 | OPα4 | EXIT | OPα5 | OPβ1# | OPβ2 | OPβ3 | OPβ4 | OPβ5 | OPβ6 |
| 3 | OPα3 | B2 | OPα4 | EXIT | OPα5 | OPβ1# | OPβ2 | OPβ3 | OPβ4 | OPβ5 |
| 2 | OPα2 | OPα3 | B2 | OPα4 | EXIT | OPα5 | OPβ1# | OPβ2 | OPβ3 | OPβ4 |
| 1 | B1 | OPα2 | OPα3 | B2 | OPα4 | EXIT | OPα5 | OPβ1# | OPβ2 | OPβ3 |
| 0 | OPα1 | B1 | OPα2 | OPα3 | B2 | OPα4 | EXIT | OPα5 | OPβ1# | OPβ2 |

APPARATUS AND METHOD IN A DIGITAL COMPUTER FOR ALLOWING IMPROVED PROGRAM BRANCHING WITH BRANCH ANTICIPATION REDUCTION OF THE NUMBER OF BRANCHES, AND REDUCTION OF BRANCH DELAYS

BACKGROUND OF THE INVENTION

1. Field of the Invention

This invention relates to instruction processing in an electronic digital computer. More particularly, this invention relates to apparatus and a method in a digital computer which allows improved program branching by anticipating branches, reducing the number of branches, and reducing branch delays.

2. Description of Prior Art

The complexities of modern life have generated the need for the electronic processing of vast amounts of data. This need has triggered the development of large scale, fast electronic digital computers which process these vast amounts of data by processing sequences of instructions within the computer. To meet the ever increasing needs of data processing, speed in processing instructions is of the essence.

Modern digital computers have included the concept of concurrency or overlap of instruction processing in order to meet this ever increasing speed requirement. Speed of performance for this type of system is very good for straight line, or nonbranching, instruction coding. However, branching in a digital computer program is a virtual necessity. Branching in prior art apparatus and methods in digital computers has seriously degraded computer performance. This is because there is always a certain arithmetical critical path, when performing a branch, which cannot be overlapped or concurrently processed due to seriality. That is, the result of a first computation is used as the input to a second computation, and so on. Furthermore, due to the necessity of resolving branch conditions, the instruction sequencing mechanism of a computer would not know which sequence of instructions to prepare at a branch point, using apparatus in the prior art. This results in a loss of concurrency or overlap with attendant performance degradation.

Accordingly, it is a general object of this invention to provide an apparatus and method which allows improved digital computer performance when branching from a first instruction sequence to a second instruction sequence.

A more particular object of the invention is to effect apparatus and a method in a digital computer which permits the preparation of branch operands, namely, condition determination and effective branch address, to be separated from the point in the program at which the branch is actually to be taken.

It is a further object of this invention to effect apparatus and a method in a digital computer which allows branch conditions to be separated from their use in a branch, and which allows the accumulation of many condition tests, and which further allows the tests to be done in an order different from the use of the test results.

It is still a further object of this invention to effect apparatus and a method in a digital computer which allows one condition test to be used for several program branches.

It is yet a further object of this invention to effect apparatus and a method in a digital computer which allows a compound branch condition to be satisfied by a single branch instruction rather than several branch instructions.

It is still another object of this invention to provide apparatus and a method in a digital computer whereby a multiway branching function is accomplished by several branch instructions and an instruction indicative of the point in the computer program at which the branch is to be actually taken, rather than by branching to other branch instructions.

SUMMARY OF THE INVENTION

Apparatus and a method in a digital computer are disclosed which allow improved program branching. Branching may be defined as the alteration of sequential execution of instructions from a first sequence of instructions to a second sequence of instructions. Means are provided for detecting a branch instruction in said first sequence indicative of the fact that, upon successful determination of the branch condition indicated in said branch instruction, a program branch is to be made from a point in the first sequence defined by a subsequent specific type marker instruction (hereinafter referred to as an exit instruction) to a target instruction in the second sequence of instructions. Means are provided for determining the condition specified within said branch instruction, said determination indicative of whether or not the branch is to be taken. If the condition is determined as successful, the associated branch instruction is referred to as a successful branch. Means are also provided for detecting the exit instruction, said detection being indicative of when the branch is to be taken if the specified condition is determined successful. Further means are provided for determining the storage address containing the target instruction to which the branch is to be made, namely, the effective branch address (EBA). Upon detection of said exit instruction after a successful condition determination, means are provided for transmitting the effective branch address to the storage system and ordering instructions at addresses beginning with said effective branch address, said ordered instructions to be the next instructions processed after said exit instruction, the instructions between said successful branch instruction and said exit instruction being processed in normal sequence.

Means are provided for allowing two or more branch instructions to occur for condition determination purposes without an intervening exit. These means detect each branch instruction in order. The first branch instruction whose machine condition is determined as successful governs the effective branch address initiating the new instruction sequence to be taken at the next exit, while other branch instructions which follow the said successful branch instruction but precede the exit instruction are ignored. As will become more apparent, the set of branch instructions which relate to a single exit instruction need not be in adjacent storage locations but may be interspersed with other instructions except, of course, other exit instructions. Means are further provided such that if an exit instruction occurs without a successful branch having been executed since the last previous exit, the instruction flow continues in a sequential or nonbranching manner.

In one aspect of our invention, a shiftdown buffer is provided comprising several storage levels. Instructions are entered one per machine cycle in a first storage level and are shifted downwardly once per machine cycle thereafter. The final storage level of the buffer functions as an instruction register from which an instruction is decoded. From this instruction register, a branch instruction is decoded and the parameters going into the condition determination and the effective branch address calculation are detected.

Means including logic circuitry are provided for detecting an exit instruction upstream from the decoded branch instruction, and for allowing the processing of the instructions between said decoded branch instruction and said exit instruction in a normal sequence under all conditions. However, means are provided which, upon successful determination of a machine condition indicated in the decoded branch instruction, and upon the detection of said exit instruction upstream from said branch instruction, transmit said effective branch address to said storage system for ordering new instructions from storage locations beginning with the target instruction located at said effective branch address. These instructions are ordered in advance of the time which they are needed, inasmuch as there may be instructions in the buffer between said successful branch instruction and said exit instruction, which are to be processed before said new instructions from locations beginning at the effective branch address. Circuitry is provided for insuring that the instructions processed after an exit instruction upstream from a successful branch instruction are those instructions ordered from locations beginning with the effective branch address.

Means are also provided for detecting more than one branch instruction without an intervening exit instruction. In this situation circuitry insures that the first successful branch governs the effective branch address for the next exit and that other branch instructions which follow the successful branch but precede the exit instruction are ignored.

The present invention offers several advantages over prior art branching apparatus and methods. Primary among these are the ability to anticipate branches, the ability to reduce the number of branches and the ability to reduce branch delays. With these abilities, the branching apparatus and method according to the invention can enable a highly parallel computer to overlap most branches such that branching takes a minimal delay, and essentially full data rate is maintained across the branch points.

An example of the anticipation time offered by the apparatus of the present invention can be seen by comparison with a prior art branching apparatus in Table I.

TABLE I

| Prior art | Prior invention |
|---|---|
| OP | OP |
| OP | BRANCH (Condition determination and EBA calculation made here) |
| BRANCH (Condition determination made here, no anticipation) | OP |
| | OP |
| | . . |
| | OP |
| | EXIT (To target instruction in effective branch address) |

Thus, it can be seen that in prior art apparatus the condition determination for the branch instruction is made at the same point at which the program exits in the branch direction. Thus, a significant loss of time occurs. As can be seen from the second column of Table I, the present invention allows the preparation of the branch operands, including condition determination and calculation of the effective branch address to be separated from the exit signal. Thus, the sequencing unit can adjust the instruction stream in the branch direction or continue in the straight line direction without significant loss of time.

Another advantage is the ability to make the branch instructions conditioned upon any combination of a multiplicity of bits of a condition register so that a compound condition can be satisfied by a single branch instruction, instead of requiring several branch instructions. This can be seen in comparison with prior art branching in Table II.

TABLE II

| Prior art | Present invention |
|---|---|
| OP | BR if a and b |
| OP | OP |
| BR if not a | OP |
| BR if B | EXIT |
| OP | OP |

As can be seen, in prior art branch apparatus when branching on two conditions, a plurality of branch instructions are necessary with the attendant processing of two exit points. However, the present invention allows branch instructions to be conditioned on any combination of any two bits, for example, of a condition register, so that a compound condition can be satisfied by a single branch instruction instead of several branch instructions.

Another advantage of the present invention can be seen by the manner in which multiway branches are handled. This is seen in Table III.

TABLE III

| Prior art | Present invention |
|---|---|
| IF a, BRANCH to $\alpha$ | IF a, BRANCH to $\alpha$ |
| IF b, BRANCH to $\beta$ | IF b, BRANCH to $\beta$ |
| | OP |
| | OP |
| | OP |
| | EXIT |

Thus, it can be seen, that since the invention has provisions for assuring that subsequent branches after a successful branch condition are ignored, then a multiway branching function can be accomplished by several branch instructions and the processing of only one exit, rather than by the conventional method of branching to other branch instructions, each of said other branches requiring a separate processing of an exit.

Accordingly, the foregoing and other objects, features, and advantages of the invention will be apparent from the following more particular description of a preferred embodiment of the invention, as illustrated in the accompanying drawings.

BRIEF DESCRIPTION OF THE DRAWINGS

FIGS. 5 through 7A show graphic examples of the operation of our invention.

DESCRIPTION OF THE PREFERRED EMBODIMENT STRUCTURE

Figures 1, 1B:
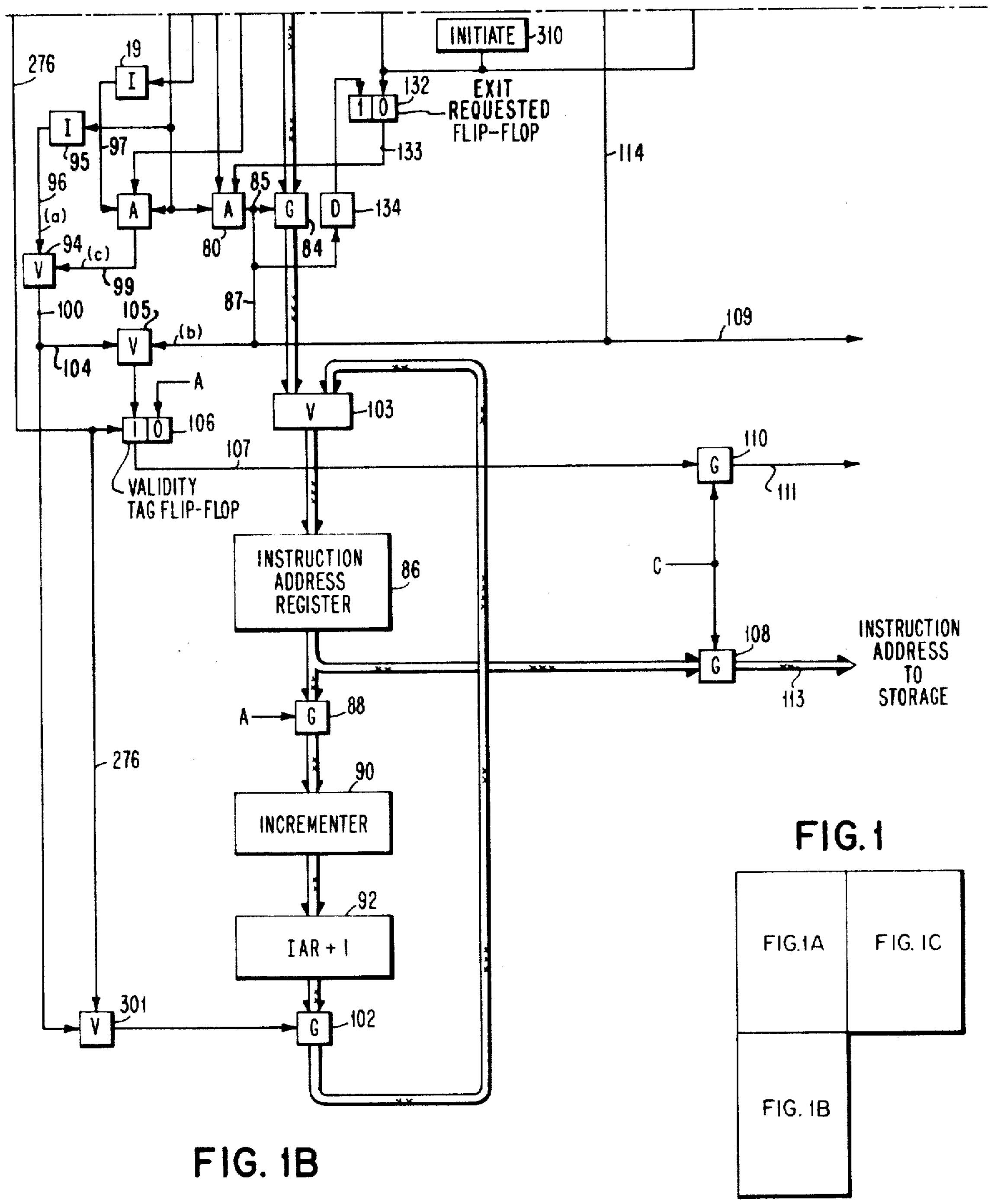
FIG. 1 shows how FIGS. 1A—1C relate to each other.
FIGS. 1A—1C show an embodiment of our invention.
Figure 1A:
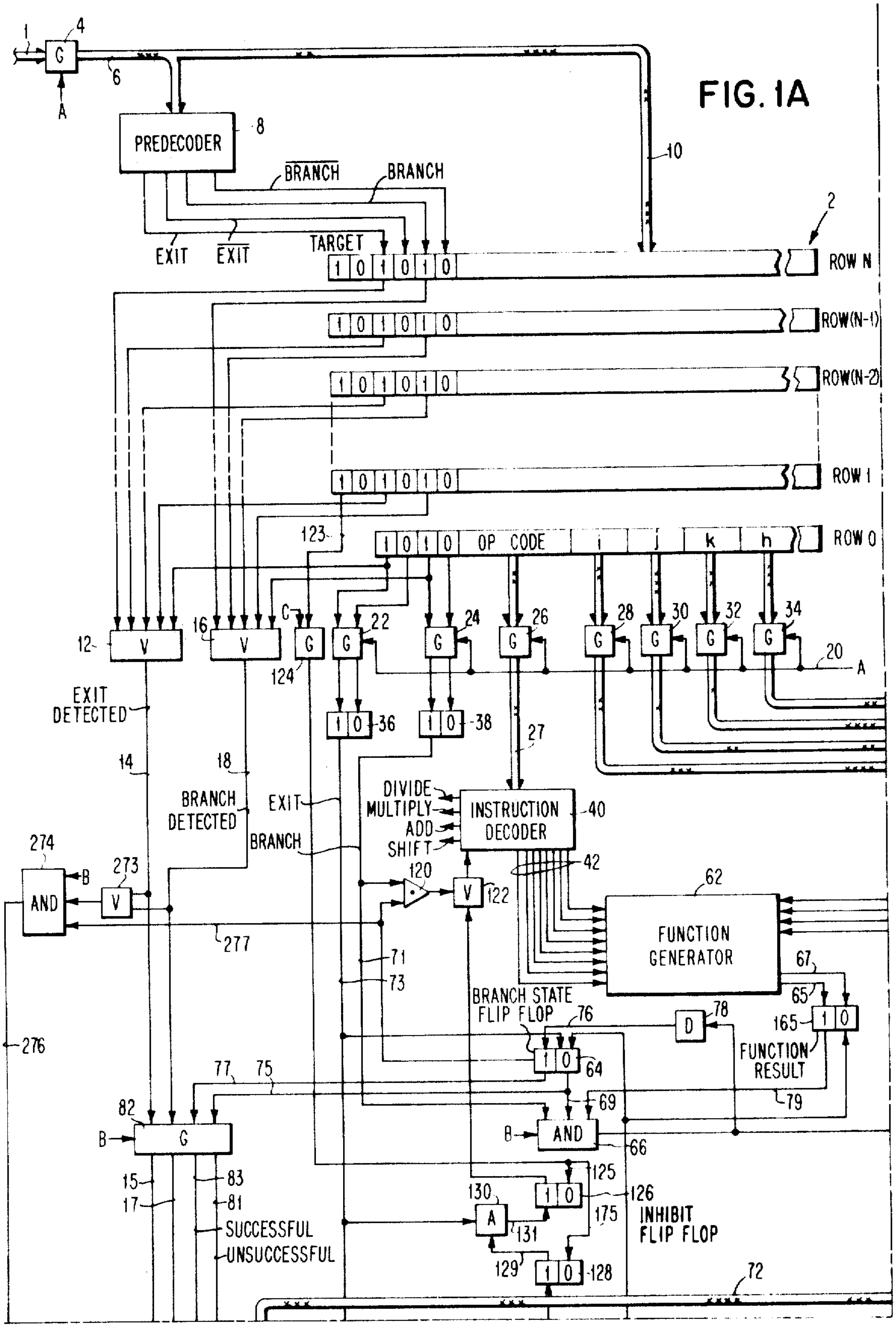
Figure 1C:
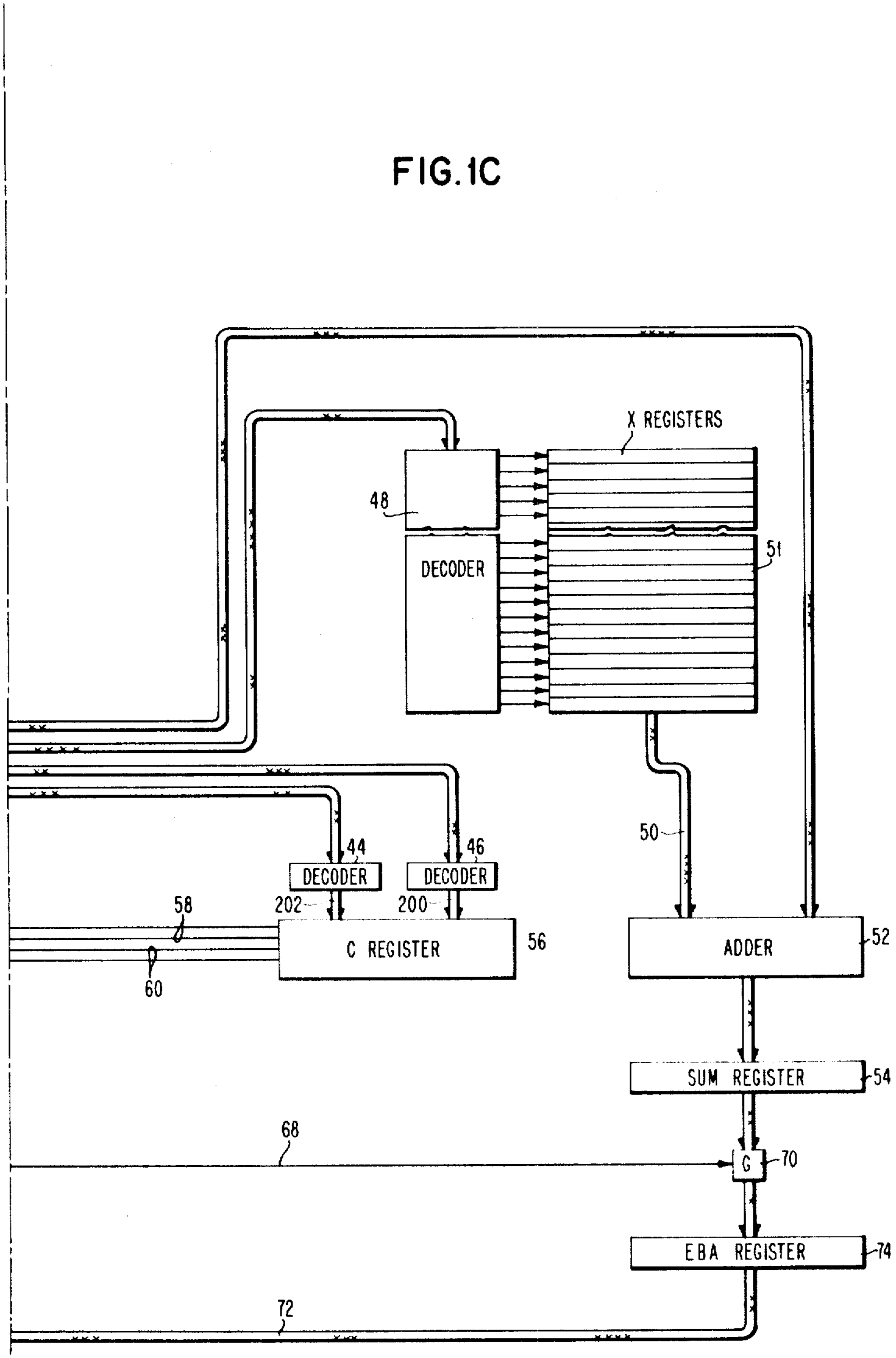

The structure of an embodiment of our invention is seen generally in FIGS. 1A—1C placed adjacent each other as seen in FIG. 1. Before proceeding with the description of FIGS. 1A—1C, it is to be noted that the operation of this embodiment described subsequently is in terms of a machine cycle having three subtimes, namely, A, B, and C. Subsequent references to a machine cycle subtime, such as for example, A-time, indicates a pulse that occurs during that portion of the machine cycle.

Figure 4:
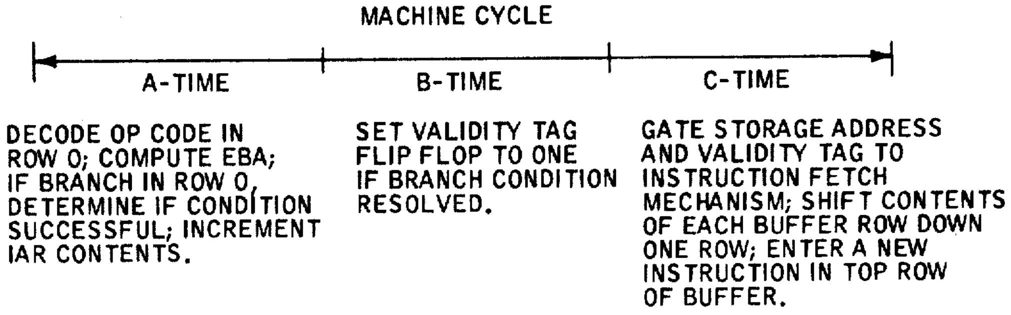
FIG. 4 shows a basic machine cycle of the apparatus of our invention.
Figure 4A:
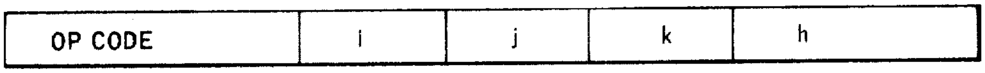
FIG. 4A shows the format of an instruction useful in our invention.

With reference to FIG. 4A, there is seen a representation of an instruction which may be used in the present invention. As seen in that FIG., the instruction comprises an OP code field, and I-, J-, K-, and H-fields. The OP code of the instruction designates the operation which the instruction signifies. For example, if an OP code is eight binary bits wide, there is a possibility of 256 operations which that field can signify. In the present example, branch instructions comprise a subset of the group of possible OP code configurations. For example, eight types of branch instructions can be signified, each signifying a branch on a different machine condition. The condition is generally determined by a function of two bits of a condition register, explained subsequently. It is recognized that more than two bits can be used in the condition determination if desired. The I- and J-fields of the instruction select the two bits of the condition register. The K-field designates one of a plurality of registers, the content of which, with the contents of the H-field of the instruction, is used to compute the effective branch address. The function of the two bits of the condition register which is computed is specified by the operation code. If the value of the function is true, the branch is called successful, and the sequence of instructions is altered at the next exit instruction by processing as the next instruction the target instruction located at the EBA. If the value of the function is false, the branch is called unsuccessful and no alteration of the instruction sequence occurs. Eight functions can be specified, as seen in Table IV. These are merely illustrative, and it is recognized that many more can be specified without departing from the spirit and scope of our invention.

TABLE IV

| | |
|---|---|
| $C_i$ and $C_j$ | $C_i$ or $C_j$ |
| $C_i$ and $\overline{C_j}$ | $C_i$ or $\overline{C_j}$ |
| $\overline{C_i}$ and $C_j$ | $\overline{C_i}$ or $\overline{C_j}$ |
| $C_i=C_j$ | $C_i \neq C_j$ |

Thus, for example, and assuming an 8-bit OP code, a specific bit configuration of the high order five bits would indicate that the instruction is a branch instruction and the low order three bits of the instruction indicates which of the above eight functions is to be computed to determine whether or not the branch is to be taken.

Having explained a generalized configuration of a branch instruction used in the operation of our invention, we will refer to FIGS. 1A—1C to describe the structure of one embodiment of our invention. As seen in FIG. 1A, instructions enter via gate 4 at A-time from the storage system and proceed over bus 6. The entire instruction, including a bit indicative of the fact that a given instruction is the target instruction, that is, the instruction from the effective branch address to which a program is to branch, is entered into buffer 2. Buffer 2 is a pushdown stack-type buffer, well known to those skilled in the art. The contents of each row of the buffer shifts down one row at C-time. The OP code of the instruction is also sent to predecoder 8 which can be a well-known binary decider which determines whether the particular instruction is, or is not, a branch or an exit instruction, and sets a bit accordingly in the top row of the buffer. The bit in each row of the buffer indicative of the fact that the instruction in that row is an exit instruction is connected to OR gate 12 such that line 14 is active whenever there is an exit outstanding in the buffer. The bit in each row indicative of the fact that the instruction in that row is a branch instruction is connected to OR gate 16 such that line 18 is activated whenever there is a branch outstanding in the buffer. Whenever the storage system orders instructions beginning at the target instruction in a branch, a bit is added to that target instruction as it is being ordered from storage and accompanies the instruction into the topmost row of the buffer via cable 10. This bit is shifted downwardly with the target instruction one row at each C-time until the target instruction reaches row 1. That bit position of row 1 is connected via line 123 to gate 124 to indicate when activated that the next instruction to be processed is the target instruction.

Row 0 of the buffer functions generally as an instruction register from which instructions are processed. The bit of Row 0 indicative of the fact that the contents of the row is an exit instruction is connected via gate 22 to flip-flop 36. At A-time, the value of this bit is gated to set or reset flip-flop 36 such that line 73 is active during a machine cycle when an exit instruction is in Row 0. The bit indicative of the fact that the contents of Row 0 is a branch instruction is connected via gate 24 to flip-flop 38 such that at A-time the value of that bit is gated to set or reset flip-flop 38. Therefore, line 71 will be active during the machine cycle in which there is a branch instruction in row 0. The OP code section of row 0 is connected via gate 26 to instruction decoder 40 over bus 27. The I- and J-field sections of Row 0 are connected via gates 28 and 30, respectively, and over busses 29 and 31, respectively, to decoders 44 and 46 in order to select the indicated bit of condition register 56 via busses 202 and 200, respectively. Decoders 44 and 46 are well-known binary to one-out-of-N decoders. The K-field portion of Row 0 is connected via gate 32 over buss 33 to decoder 48 to select one of a plurality of registers hereinafter referred to X-registers 51. Decoder 48 is a binary to one-out-of-N decoder, well known to those skilled in the art, used to gate the contents of one of said X-registers to adder 52 via bus 50. Each X-register can contain one addend which enters a computation to obtain an effective branch address and is settable by conditions within the digital computer, which can be designated by designer's choice. The H-field portion of Row 0 is connected via gate 34, gatable at A-time, over bus 35 to adder 52. The contents of the H-field contain the second addend of the effective branch address. The two above-mentioned addends are added in adder 52 and the sum is stored in sum register 54 for possible subsequent use as an EBA.

With continued reference to FIGS. 1A—1C, positioned relative to each other as shown in FIG. 1, Sum Register 54 is connected to EBA Register 74 via gate 70. Bus 72 connects EBA Register 74 to Instruction Address Register 86 via gate 84 and OR 103. Gate 108 gates the contents of Instruction Address Register 86 to the storage system at C-time of each cycle, to order a new instruction from the storage address indicated by said contents when the one side of Validity Tag Flip-Flop 106 is active thus providing an indication over line 111 via gate 110 that the address from register 86 is valid. Instruction Address Register 86 is also connected to Incrementer 90 via gate 88. At A-time of a given cycle, the contents of Register 86 are gated to Incrementer 90 where said contents are incremented by 1 and stored in IAR+1 Register 92. This incremented sum is then gated via gate 102 at B-time of a given cycle, as will subsequently be explained in more detail, back to Instruction Address Register 86 to be gated at C-time of the cycle via gate 108, to order a new instruction at the next sequential address in storage if line 111 indicates the address is valid.

When a branch instruction in the first instruction sequence has been determined successful, the detection of the first exit instruction, after the successful branch instruction, causes line 85 to enable gate 84 so that the EBA is gated into Instruction Address Register 86 to be sent to the storage system at C-time of that cycle to begin ordering instructions in the second instruction sequence for processing after the exit, said ordered instructions beginning with the target instruction. The EBA in register 86 is incremented in Incrementer 88 during A-time of the next cycle as explained above, and instructions are ordered from sequential storage addresses thereafter.

Also seen in FIG. 1A is function generator 62. Function generator 62, described in detail in FIG. 2, has an input from lines 42 from instruction decoder 40 and inputs from lines 58, 60 from condition register 56. If the present instruction being decoded is a branch instruction, one of the lines 42 will indicate a particular function to be calculated from the values of the bits of the condition register, designated by the I- and J-fields, and bits entering the function generator over lines 58, 60. If the function is true, the one side of Function Result Flip-flop 65 is activated and the branch is considered successful. If the value of the function is false, the zero side of the flip-flop 65 is activated. Moving ahead for a moment, the detailed structure of function generator 62 and condition register 56 will now be discussed.

DETAILED STRUCTURE OF FUNCTION GENERATOR AND CONDITION REGISTER

For the present example, eight functions of Table IV are designated. It is, of course, recognized by those skilled in the art that more than eight functions could be designated. The presence of one of the designated functions in the OP code will therefore activate one of lines 42 to function generator 62.

Figure 3:
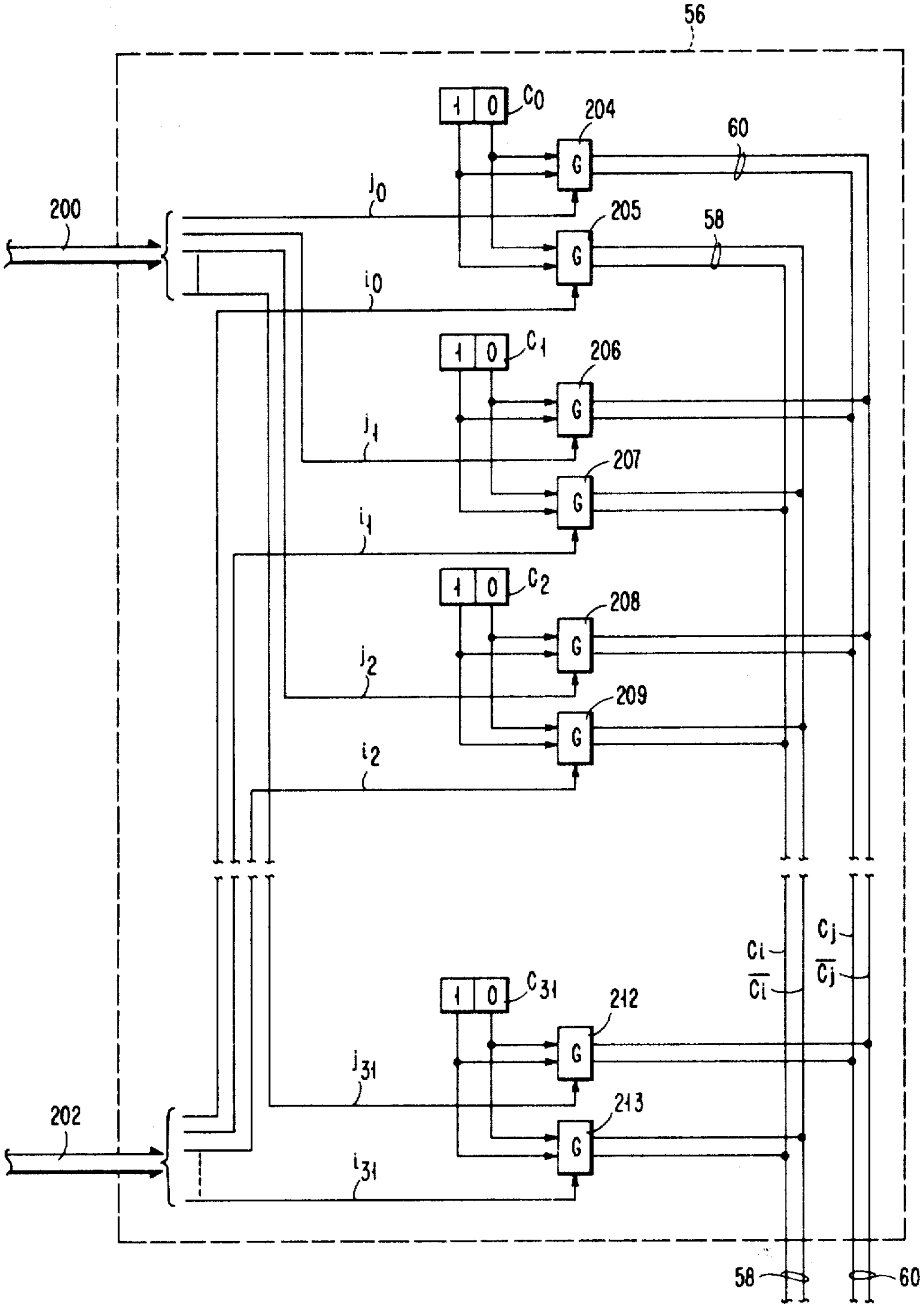
FIG. 3 is a detailed representation of the condition register seen generally in FIG. 1C.

As mentioned previously, the I- and J-fields indicate which bits of the condition register are to be inputs to the computation. Thus, at A-time, the I- and J-fields are gated from Row 0 into decoders 44 and 46, respectively. Decoder 46 is connected by way of bus 200 to condition register 56. Likewise, decoder 44 is connected via bus 202 to condition registers 56. Condition register 56 is seen in detail in FIG. 3. This register comprises a plurality of flip-flops, here shown illustratively as 32 in number, and designated $C_0$, $C_1$, $C_2$,..., $C_{31}$. Two pairs of output lines 58, 60 are provided as outputs from the register. The lines in 58 comprise $C_i$ and $\overline{C_i}$, indicative of the true and complement value, respectively, of the contents of the bit of the condition register designated by the I-field of the instruction in Row 0. Likewise, the lines in group 60 are designated $C_j$ and $\overline{C_j}$, indicative of the true and complement value, respectively, of the bit of the condition register indicated by the J-field of the instruction in Row 0. Each flip-flop in the condition register is connected to output lines 58, 60 through suitable gating means such as 204, 205 illustrated for bit $C_0$. It will be recalled that the I-field decoder 44 and the J-field decoder 46 were conventional binary to one-out-of-N decoders. For the present example, it can be assumed that N is equal to 32 lines. Thus, the I-field and the J-field will indicate one out of 32 bits of the C-register upon which a function will be computed in the function generator 62 to determine whether or not the branch condition designated by a branch instruction in Row 0 is successful. Entrance bus 200 from decoder 46 is also seen in FIG. 3. Each wire indicative of the bit selected by the J-field is indicated as $J_0, J_1, J_2,..., J_{31}$ and serves to gate the value of the selected bit via gates 204, 206, 208,..., 221. Likewise, bus 202 enters condition register 56 from decoder 44 and each line of the bus indicates the particular bit of the condition register selected by the I-field. These are designated $I_0, I_1, I_2,...,I_{31}$ and serve to gate the value of the selected bit via gates 205, 207, 209,...,213. Thus, upon energization of gates 28 and 30 over line 20 at A-time, decoders 44 and 46 will decode the value of the I- and J-fields, respectively, which each designate the particular bit in the C-register upon which a function will be computed and tested to determine whether the branch in row 0 is successful. Thus, for example, if the J-field designates bit 0 and the I-field designates bit 31, the true and complement values of the contents of the bit $C_0$, will be gated to lines 60 via gates 204, 205 and the true and complement values of bit $C_{31}$, will be gated to lines 58 via gates 212, 213. The values of bits $C_0, C_1,...,C_{31}$ are dependent upon the various machine conditions, according to the requirements of the system and are set by means within the system which do not form a part of this invention.

Figure 2:
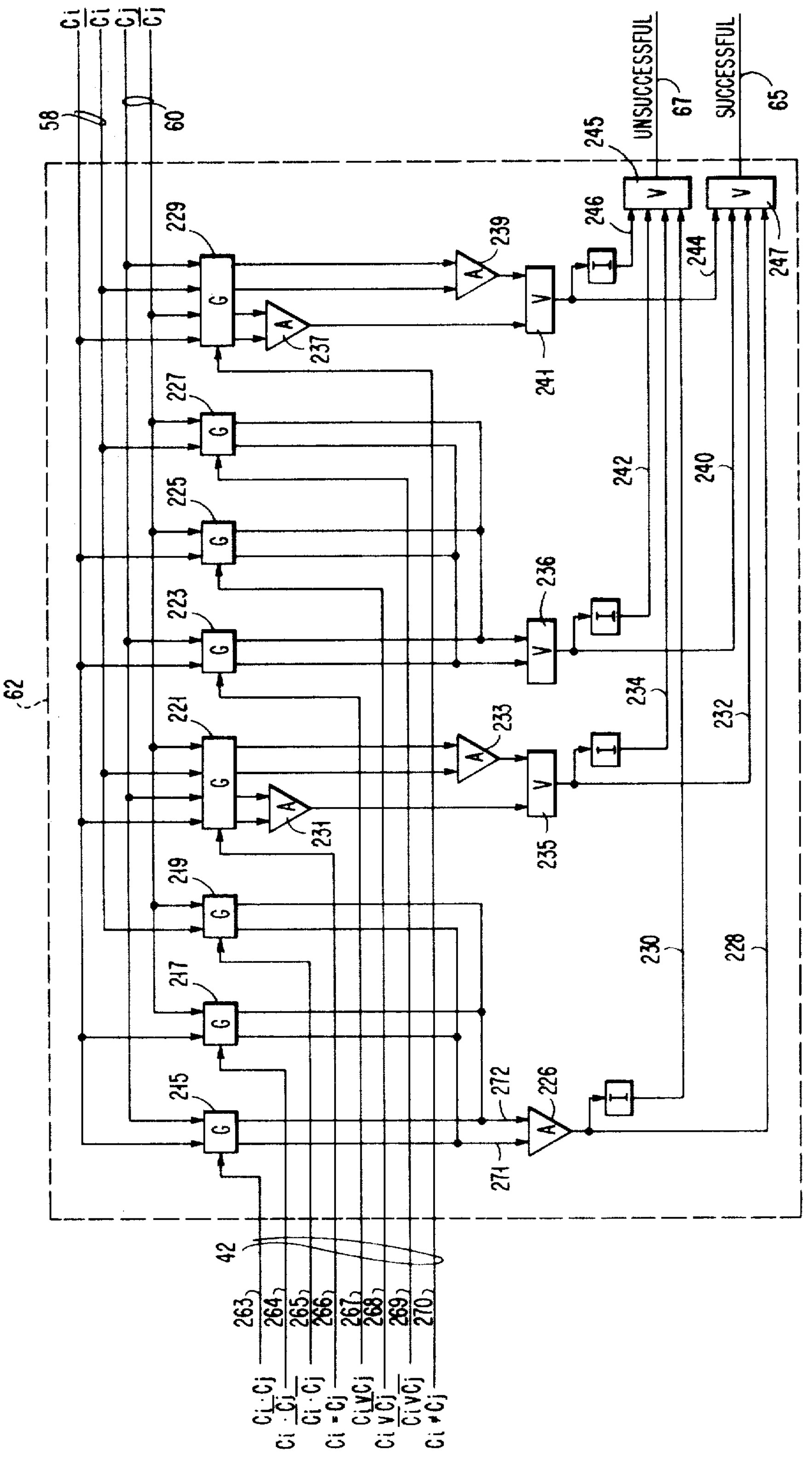
FIG. 2 is a detailed representation of the function generator seen generally in FIG. 1A.

Moving to FIG. 2, the detailed structure of the function generator will now be discussed. It will be recalled from the description of FIGS. 1A—1C that instruction decoder 40 decodes the OP code field of the instruction in Row 0. If that instruction, when decoded, is found to be a branch instruction, the type of branch instruction as seen in Table IV is indicated by one of the output lines 42. That is, the particular one of lines 42 which is activated will indicate the function of the two bits of the condition register, specified by I-field and J-field, which is to be computed. Referring to FIG. 2, lines 42, comprising lines 263, 264, 265,...,270 form gating inputs to the function generator 62. The two pairs of lines 58, 60 from the C-register, explained above, are also inputs to the function generator. Lines 58 are indicative of the true and complement values of the particular bit of the condition register selected by the I-field, while lines 60 are indicative of the true and complement values of the particular bit of the condition register selected by the J-field. Function generator 62 also includes output line 65 which indicates that the specified function of the selected bits of the condition register has been computed as true, and the branch will be successful. This will result in Function Result Flip-Flop 165 being set to the one state and a signal being promulgated over line 79 of FIG. 1A. Line 67 in FIG. 2 is also provided which, when activated, indicates that the specified function of the two bits selected by the I- and J-fields was found to be false and hence the branch is unsuccessful. This line will set the zero side of Function Result Flip 165 of FIG. 1A, thus deactivating line 79 if it was active. The function generator of FIG. 2 further includes gates 215, 217, 219,...,229. Gate 215 has as inputs the true values of bits $C_i$ and $C_j$, and is gated by line 263. Gate 217 has as its inputs the true value of $C_i$ and the complement value of $C_j$, and is gated by line 264. Gate 219 has as its inputs the complement of $C_i$ and the complement of $C_j$, and is gated by line 265. The outputs of gates 215, 217, 219 are connected as inputs to AND gate 226. Thus, activation of any of lines 263, 264 or 265 will provide an indication on line 228 if the AND function of the specified inputs is true and thus will activate line 65 via OR gate 247. If the value of the AND function is false, line 230 will activate line 67 via gate 245. Continuing, gate 221 has as its inputs both the true and complement value of both $C_i$ and $C_j$ and is gated by line 266. Upon gating by line 266, the true values of $C_i$ and $C_j$ are gated to AND gate 231, and the complement values of $C_i$ and $C_j$ are gated to AND gate 233. The output of each said AND gate serves as an input to gate 235 such that if $C_i$ is equal to $C_j$ upon activation of line 266, line 232 will activate line 65 via gate 247, indicating that the branch condition $C_i$=$C_j$ has been found to be successful. If $C_i$ is not equal to $C_j$ when line 266 is activated, then line 234 will activate line 67 via OR gate 245 and the branch condition is unsuccessful. Gate 223 has as its input the true values of $C_i$ and $C_j$ and is activated by line 267, when the function to be computed is $C_i$ OR $C_j$. Likewise, gate 225 has as its input the true value of $C_i$ and the complement of the value of $C_j$ and is gated by a line 268 which indicates that the function to be computed is $C_i$ or $\overline{C_j}$. Gate 227 has as its input the complement values of both $C_i$ and $C_j$ and is gated by a line 269 indicating that the function to be computed is $\overline{C_i}$ OR $\overline{C_j}$. The outputs of gates 223, 225, and 227 are connected as inputs to OR gate 236. Upon activation by any one of lines 267, 268 or 269, OR gate 236 will compute the specified OR function of the inputs to the respective gates activated, and, if the function is true, line 240 will activate line 65 via gate 247 to indicate that the branch condition is successful. If the function is false, line 242 will activate line 67 via gate 245, indicative that the branch condition is unsuccessful.

Gate 229 has as its input both true and complement values of both $C_i$ and $C_j$, and is gated by line 270, which indicates that the function $C_i \neq C_j$ is to be computed.Upon being enabled by line 270, gate 229 will gate the true value of $C_i$ and the complement value of $C_j$ to AND gate 237, and will gate the complement value of $C_i$ and the true value of $C_j$ to AND gate 239. The outputs of AND gate 237 and 239 are connected to the input of OR gate 241, such that upon the true outputs of either of AND gates 237 or 239, OR circuit 241 will have an output indicative of the fact that $C_i$ is not equal to $C_j$, and line 244 will activate line 65 via OR gate 247. Likewise, if upon the activation of line 270, neither gate 237 nor 239 has a true output, then line 246 will activate line 67 via OR gate 245, indicative of the fact that the function $C_i \neq C_j$ is false, and the branch condition is unsuccessful. It is to be noted that at most only one of the group of lines labeled 42 can be up at any one time and this will occur during A-time, since during this time gate 26 has gated the output from Row 0 into instruction decoder 40 in FIG. 1A. Likewise, at this time, gates 28 and 30 will have gated the I- and J-fields to decoders 44 and 46, respectively, to select the proper bits, $C_i$ and $C_j$, from the C-register 56 of FIG. 3. Therefore, if the current instruction is a branch, the function generator receives the selected value of the two bits from the condition register and also receives an enabling signal from one of the lines 42, indicative of the machine condition upon which the branch is to be taken and computes the indicated function. If the function is true, the successful line 65 turns the Function Result Flip-Flop 165 to its one state. If the condition is false, the unsuccessful line 67 sets the Function Result Flip-Flop of FIG. 2 to its zero state.

Branch Logic

Reference is made to FIGS. 1A—1C. In these FIGS., certain logic components are shown for effecting branching according to one embodiment of the invention. OR gate 12 is connected by line 14 to gate 82. Line 14 is activated whenever an exit instruction is outstanding in the buffer. Likewise, OR gate 16 is connected to gate 82 by line 18, which when activated indicates that there is a branch instruction outstanding in the buffer. The one side of flip-flop 36 is connected via lines 73 to Branch State Flip-Flop 64, lines 73 being activated when an exit instruction is present in row 0 during A-time, to set the Branch State Flip-Flop to its zero state. In its zero state, Branch State Flip-Flop 64 indicates that a branch is not to be taken at the next exit instruction. In its one state, it indicates a branch is to be taken at the next exit instruction. The one side of flip-flop 38 is connected via line 71 to AND gate 66, as are the zero side of Branch State Flip-Flop 64 via line 69 and the one side of Function Result Flip-Flop 165 via line 79. AND gate 66 is sampled at B-time and if lines 71, 69 and 79 are activated, line 68, which is an enabling line from AND gate 66 to gate 70, and which also activates setting line 76 to the one side of Branch State Flip-Flop 64 through delay 78, is activated. Delay 78 is chosen such that line 68, having been activated during B-time will not activate line 76 until during C-time. Line 71 and the one side of Branch State Flip-Flop 64 also serve as enabling inputs to AND gate 120. The output of AND gate 120 serves as one input to OR gate 122, the output of which serves as an inhibit line to instruction decoder 40. The operation of this inhibit line will be made more clear subsequently.

Lines 14 and 18 are also connected to OR 273 of FIG. 1A. OR 273 is connected as an enabling input to AND 274. Line 277 connects the one side of Branch State Flip-Flop 64 to AND 274. B-time also forms an enabling signal to AND 274. Line 276 is a setting line from AND 274 to the one side of Validity Tag Flip-Flop 106 and is also an input to OR 301.

Gate 82 of FIG. 1A is activated at B-time. Line 15 is connected from gate 82 and forms one input to both AND gate 80 and AND gate 98 of FIG. 1B. Line 15 is also connected via inverter 95 and line 96 to OR gate 94. If line 96 is activated at B-time, it indicates that no exit is outstanding in the buffer 2. Line 17 is connected from gate 82 via inverter 19 and line 97 to enable AND gate 98. If line 97 is activated during B-time, it indicates that there is no branch outstanding in the buffer 2. Line 81 is connected as an enabling input to AND gate 98. Line 123 is connected from the Target Instruction Bit of Row 1 of the buffer to gate 124 of FIG. 1A, which is activated at C-time. Line 15 also connects gate 82 to AND gate 80. If this input to AND gate 80 is activated during B-time, it indicates that there is an exit instruction outstanding in the buffer. Line 83, indicative of the fact that the branch condition was determined as successful and that the branch is to be taken at the next exit instruction, is connected as an extension of line 77 via gate 82 to AND gate 80. Line 133 is connected from the zero side of EBA Requested Flip-Flop 132 as a further enabling input to AND gate 80. The activation of line 85 via AND 80 activates gate 84 which serves to gate the effective branch address from the EBA register 74 into the Instruction Address Register 86 via OR gate 83. Concurrently, line 85 serves to activate the one side of Validity Tag Flip-Flop 106 via gate 105. As will subsequently be seen, line 133 insures that for a successful branch, the EBA for the target instruction will be sent to the storage system only once, and that instructions thereafter will be taken from sequential addresses after the EBA.

On the other hand, if AND gate 98 of FIG. 1B is activated at B-time, it indicates that there is no branch outstanding in the buffer, by virtue of line 97 being activated; that there is an exit outstanding in the buffer, by virtue of the activation of line 15, and, by virtue of the activation of line 81, that the branch was unsuccessful. The concurrency of these three conditions will activate OR gate 94 via line 99 and cause the one side of flip-flop 106 to be set via lines 100, 104 and OR gate 105.

On the other hand, if line 15 is not activated at B-time, line 96 will be activated via inverter 95 to set the one side of flip-flop 106 via OR gate 94, lines 100 and 104, and OR gate 105. In either event, line 100 enables gate 102 via OR 301 to place the incremented address from register 92 into Instruction Address Register 86 for gating to the storage system at C-time of the cycle.

Line 73 is also connected as a setting line to the zero side of EBA Requested Flip-Flop 132. Line 133 is connected from the zero side of the EBA Requested Flip-Flop as one enabling line to AND 80. Lines 15 and 83 are also enabling lines connected to AND 80. Activation of the zero side of the EBA Requested Flip-flop via line 73 indicates that an exit instruction in the buffer has been processed and that AND 80 can gate the EBA to the storage system as soon as the next successful branch instruction has been detected and an exit is detected outstanding in the buffer. These conditions are indicated by activation of lines 83 and 15, respectively. Therefore, when lines 15, 83 and 132 are activated, line 85 enables gate 84 to transmit the EBA from EBA Register 74 to Instruction Address Register 86. Line 85, when activated, also causes the EBA Requested Flip-Flop 132 to be set to its one value through delay 134. Delay 134 is chosen long enough to allow the EBA to be transferred through gate 84 but short enough so that the switching of the flip-flop to its zero state will deactivate line 133 and hence disable AND 80 before B-time of the next cycle. This insures that the EBA is sent to the storage system only once and that the next address sent to the storage system is the EBA incremented by one for sequential processing of instructions after the branch.

Finally, line 85 is also connected to lines 109 and 114 of FIG. 1B. As explained above, the activation of line 85 indicates that the next instruction is to be ordered from the effective branch address, and will therefore be the target instruction. The activation of line 109 is a signal to the storage system which causes the target instruction bit in the target instruction contained at the effective branch address to be set to a one so that it can be identified as the target instruction when it reaches the buffer 2. This can be done in the storage system by any well-known means, such as using line 109 as a setting signal for a bit position in the register in the storage system from which the instruction proceeds to bus 1 of FIG. 1A. Line 114 is connected to the one side of flip-flop 128 of FIG. 1A. As will be made clear subsequently, there may be instructions subsequent to the exit instruction in the branched-from instruction stream remaining in the buffer, therefore located between the exit instruction and the target instruction in the branched-to instruction stream. These instructions will have to be inhibited and this may be done, for example, by inhibiting the decoding of these instructions by instruction decoder 40. The one side of flip-flop 128 is connected as one input to AND gate 130 while a second input is supplied by line 73 indicative of the fact that the exit instruction has reached row 0. The output of AND gate 130 is connected by line 131 to the one side of Inhibit Flip-Flop 126. The one side of Inhibit Flip-Flop 126 is connected to OR gate 122 the output of which serves as an inhibit line to inhibit the decoding of an instruction in instruction decoder 40. The Target Instruction Bit of Row 1 of the buffer is connected via line 123 through gate 124 to the zero side of Inhibit Flip-Flop 126 and to the zero side of Flip-Flop 128. This stops the inhibiting of instructions when the Target Instruction reaches Row 1 whereafter it is processed on the next machine cycle.

Operation

Figure 5:
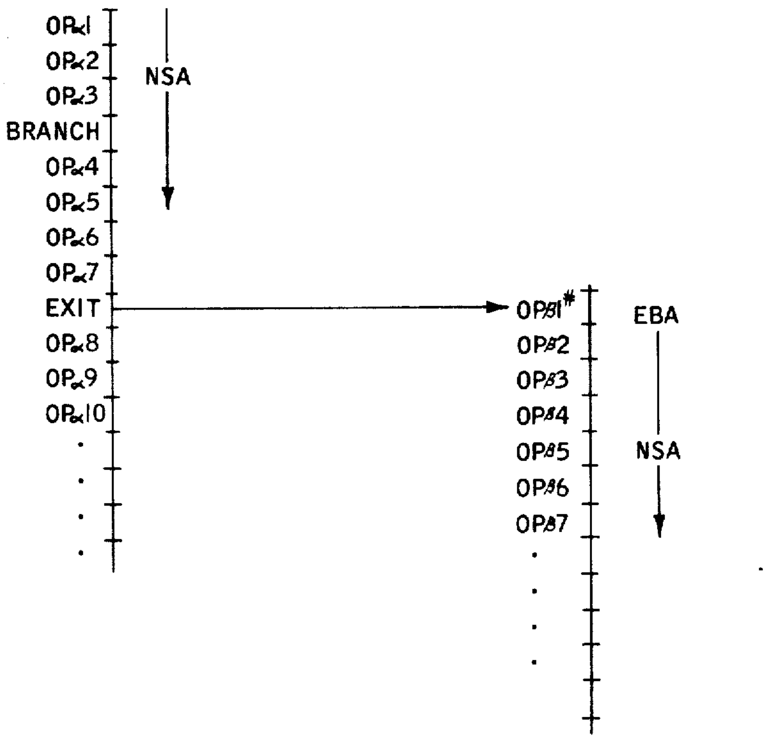
Figures 7, 7A:
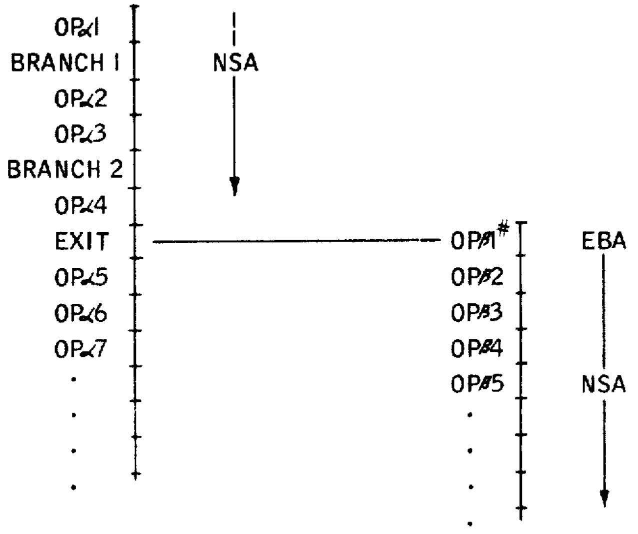

General operation of our invention can be seen with reference to FIG. 5. In that FIG., the instruction stream from which a branch may be taken, depending upon the condition determination, is seen as containing instructions OP$\alpha$1, OP$\alpha$2,... The instruction stream to which the branch is to be made is seen as having instructions OP$\beta$1, OP$\beta$2,... OP$\beta$1 is the target instruction and is marked with a 0. The typical machine operation for the instruction sequence of FIG. 5 is seen in FIG. 5A and operation will be explained with reference to FIGS. 1A—1C as well as FIGS. 5 and 5A.

The instructions in the branch-from instruction stream in FIG. 5 are ordered from the storage system, one per C-time, and proceed down the buffer from row N to row 0 in the direction of the arrow. At C-time of a given cycle, OP$\alpha$1 will be shifted from Row 1 to Row 0. At A-time of the next cycle, defined here as the first cycle for illustrative purposes, line 20 is activated and the contents of row 0 are gated through gates 22—34 as shown. Inasmuch OP$\alpha$1 is not a branch or an exit, the zero side of both the branch and the exit bits will be activated, having been preset on an earlier cycle in predecoder 8. Therefore, the zero side of both flip-flops 36 and 38 will be turned on at A-time of this first cycle. The OP code will be decoded in instruction decoder 40, and hence the instruction is not a branch, none of lines 42 will be activated. The contents of the I- and J-fields will be gated through gate 28 and 30 to select the required bits of the C-register. These bits will be sent to the function generator over two of lines 58, 60 but will be meaningless since OPα1 is not a branch and no function of the two bits is calculated. This can be seen from the function generator of FIG. 2. Since none of lines 43 are activated at this time, there will be no output at either of lines 65 or 67 to Function Result Flip-Flop 165. Inasmuch as the machine is just initiating its processing operation, it can be assumed that Function Result Flip-Flop 165 and Branch State Flip-Flop 64 are both in their zero condition. Initiate block 310 serves to illustrate that when operation starts up, flip-flops 64 and 165, as well as EBA Requested Flip-Flop 132 are set to zero by means not forming a part of this invention. Also at A-time the H-field is gated into adder 52 via gate 34 and the K-field is gated via gate 32 to select the contents of one of the X-registers via binary to one-out-of-N decoder 48, which contents are then sent via adder 52. These two addends are added in adder 52 and the sum set into sum register 54. Since Function Result Flip-Flop 165 is in its zero state, lines 68 will not be activated and the contents of sum register 54 will not be gated to become an effective branch address. With reference to FIG. 1B, flip-flop 106 is also set to its zero state at A-time which deactivates line 111 and indicates to the storage system the address on bus 113 is no longer valid. Also, gate 88 is activated to gate the address from which an instruction was fetched during the previous C-time to the incrementer where it is incremented by a 1 and placed into register 92.

At B-time, and referring to FIG. 1A, AND gate 66 is sampled. However, since flip-flops 38, 64 and 165 are zero, line 68 is not activated and no EBA is gated into register 74.

Also, gate 82 is sampled at B-time. There may or may not be an exit outstanding in the buffer, depending on the depth, that is, the number of rows of the buffer. Action occuring at B-time, will determine whether or not a valid storage address will be sent to the storage system at C-time, and if a valid address is sent whether it will be the next sequential address (NSA) or the effective branch address. This action is seen summarized in Table V below.

TABLE V

| | Exit outstanding | | Branch outstanding | | Branch state | | Action |
|---|---|---|---|---|---|---|---|
| (a) | No | (0) | | | | | Send NSA |
| (b) | Yes | (1) | | | Succ | (1) | Send EBA |
| (c) | Yes | (1) | No | (0) | Unsucc | (0) | Send NSA |
| (d) | Yes | (1) | Yes | (1) | Unsucc | (0) | Wait |

The letters on lines 87, 96 and 99 indicate activity according to the corresponding rows of Table V. Row (*a*) of the above table means that no exit instruction has yet been observed in the buffer. That is, line 14, and therefore line 15 at B-time, is inactive. If there is no exit outstanding, there is no chance that a branch is about to be taken. Therefore, the Branch Outstanding line 18 and the Branch State Flip-Flop 64 conditions are don't care functions at this time. That is, even if there were a successful branch outstanding, the NSA would be sent at the next C-time inasmuch as an exit instruction, the indicator that a branch will soon be taken, has not yet been observed in any of the rows of the buffer. Therefore, the instruction fetching mechanism must continuously request instructions in ascending numerical order, that is, by incrementing the address in the IAR 86 by one and sending it to the storage system as the NSA. In the embodiment in FIGS. 1A—1C, line 14 will not be activated at B-time when there is no exit outstanding, so that line 96 will be active, thereby subsequently enabling line 100 to gate the incremented address via OR 301, gate 102 and OR 103 to the IRA 86. Line 104 also sets flip-flop 106 to its one state. At C-time the NSA will be in the IAR register 86 and will be gated via bus 113 to the storage system. Since flip-flop 106 is in its one state, line 111 will also be activated via gate 110 to indicate to the storage system that the address on bus 113 is valid. The storage system will send the instruction from the next sequential address to the buffer, which will also be shifted downwardly one row at C-time to make room for a new instruction in transit from the storage system. It will be recognized by those skilled in the art that in ultra high speed digital computers wherein our invention may find use, there may be several cycles in the transit path between the storage system and the buffer 2. It will therefore be recognized that in steady state operations a new instruction which is requested at C-time of a given cycle will not arrive until C-time of a later cycle and that the instruction entering the top row of the buffer via bus 10 at a given C-time will have been ordered from the instruction fetch mechanism on some previous C-time. The number of cycles in the transit path is, of course, a function of the physical design of the machine according to the designer's choice and does not limit the scope of the invention. Summarizing situation (*a*) of the above table, if there is no exit outstanding in the buffer then regardless of whether a branch condition has been determined as successful, actual departure from a first instruction stream to the target instruction at the effective branch address in the new instruction stream is not yet imminent and instructions are not yet ordered from the new sequence. Therefore, the instructions at the next sequential addresses will continue to be sent to the storage system.

As seen from (*b*) in the above table, if there is an exit outstanding and the branch state flip-flop 64 indicates that a branch has been decoded and the condition determined as successful, the EBA will be sent. The exit instruction is in row N, and the branch may be in row 0 or may have passed out of the buffer completely after being determined successful. In the case that a branch is determined successful, Branch State Flip-Flops 64 will have been set to its one state. At the first B-time that an exit is observed in the buffer, line 15 will become active. Also, if a branch has been successful as postulated by row (*b*) of the table, then line 83 will also be active. Line 133 from the zero side of EBA Requested Flip-Flop 132 was assumed to be initially set to its zero state. Therefore, at B-time when an exit is first observed in the buffer and the Branch State Flip-Flop indicates that a successful branch condition has been determined, gate 80 will be activated to allow line 85 to gate the EBA via gate 84 and OR gate 103 to the IAR 86 at B-time. Also, the one side of flip-flop 106 will be set through OR gate 105 via line 87. This will activate line 107 so that at C-time, the EBA will be gated from IAR register 86 on bus 113 and line 111 will be activated to indicate that this information on bus 113 is valid. The instruction fetching mechanism will therefore begin fetching instructions at addresses beginning with the EBA, in advance of the time they are needed inasmuch as the exit has not yet reached row 0 but has just been observed in row N of the buffer and the branch has been successful (Branch State Flip-Flop set to 1). Also at C-time, line 112 will reset Exit Processed Flip-Flop 132 via delay 134 to its one condition due to line 85 having been activated. This will assure that the EBA is sent to the storage system only once and that the next storage address will be the EBA incremented by one on the subsequent cycle.

Row (*c*) of the above table indicates the situation wherein there is an exit outstanding in the buffer, there is no branch outstanding and also wherein the Branch State Flip-Flop is set to zero. In this case since there is no branch outstanding (line 17 not activated at B-time) and the Branch State Flip-Flop is set to 0, no branch will be taken and the next sequential address will be sent to the storage system. In this case, action occurs at B-time by the activation of line 97 (no branch outstanding), line 15 (exit outstanding), and line 81 (Branch State Flip-Flop set to zero). This activates AND gate 98 to enable line 99 to activate OR gate 94 to set the one side of flip-flop 106 over line 104 through OR gate 105. Also, due to the activation of line 99, the incremented address is gated to the IAR. At this point at B-time, line 107 is activated to indicate that the incremented address in IAR 86 will be valid at C-time. Therefore, at C-time the NSA is sent from register 86 over bus 113 and line 111 is activated to indicate that this address is valid.

Row (*d*) of the above table indicates an interim situation wherein an exit is outstanding in the buffer and a branch is outstanding in the buffer but the Branch State Flip-Flop is set to zero. This indicates that although there is a branch in the buffer, it has not yet reached row 0 to be decoded and therefore its condition has not yet been tested to determine whether or not the branch is successful. Also, since there is an exit outstanding this exit may be in the buffer above the branch instruction, and if the branch is determined to be successful once it reaches row 0, new addresses will be ordered beginning at the target instruction at the EBA, and the target instruction will be processed after the exit that is observed to be outstanding. Therefore, in the situation seen in row (*d*) of the above table, the Branch State Flip-Flop may change from unsuccessful (0) to a successful (1) setting. Therefore, the apparatus must wait and not take action until the setting of Branch State Flip-Flop 64 is determined. At a given B-time when this situation occurs, flip-flop 106 will be set to its zero state, having been set there at the previous A-time. At B-time, no action will be taken to reset flip-flop 106 to its one side and activate the validity tag 107. This can be seen by working through the logic of the present embodiment as follows. It has been postulated that an exit is outstanding. Therefore, at B-time, line 15 will be active and line 96 will be inactive so that OR gate 94 can not be activated by line 96. Also, line 17 is active inasmuch it is postulated that there is a branch outstanding. Hence, line 97 is inactive and AND gate 98 cannot activate line 99. Therefore, OR gate 94 cannot be activated by line 99. Also, line 83 is inactive inasmuch as it is postulated that Branch State Flip-Flop 64 is presently set to its one condition. Therefore, line 85 is inactive and the one side of flip-flop 106 cannot be set through OR gate 105 to activate the valid tag 107. Therefore at this B-time flip-flop 106 remains in its zero condition. At C-time, the previous NSA will be sent from IAR 86, but since flip-flop 106 is in its zero condition, the validity tag 111 will be deactivated and this NSA will be ignored by the storage system. The apparatus will remain in this waiting mode until the branch condition reaches row 0 and is determined either truly unsuccessful (indicated function calculated as false and Branch State Flip-Flop remains zero) or successful (indicated function calculated as true and Branch State Flip-Flop set to one). If it is determined as truly unsuccessful, the branch instruction will be shifted out of row 0 at C-time of that cycle and the machine will revert to the situation shown in (*c*) of the above table and the NSA will be sent as explained above relative to row (*c*). If the branch is determined as successful, then the situation will revert to that seen in row (*b*) of the table and the EBA will be sent as explained above relative to row (*b*). As mentioned previously, it is recognized that in ultra high speed computers, there may be several cycles of transit time in the path between the storage system and the buffer 2. Therefore in steady state operation new instructions will be entering the buffer during cycles wherein the outstanding branch, in the present situation is being shifted sequentially downward one row at a time. One or more of these new instructions may itself be a new branch instruction after an intervening exit instruction such that if the branch instruction under consideration is resolved as unsuccessful and shifted out of row 0, there will still appear to be both a branch (the postulated new branch) and an exit outstanding in the buffer. However, this presents no problem inasmuch as the exit will reach row 0 before the new branch and will be shifted out of row 0 leaving only the new branch outstanding in the buffer so that the situation reverts to that shown in row (*a*) of the table and the next sequential address is sent.

Specific Examples

An example of operation is seen in FIGS. 5 and 5A. In FIG. 5 is seen a sequence of instructions as they exist in storage, starting from storage location $\alpha 1$ and continuing sequentially. Also seen in FIG. 5 is a sequence of instructions as located in storage starting from location $\beta 1$, the EBA.. OP$\beta$1 is the target instruction to which the branch is to be taken at the EXIT, if the condition indicated in the BRANCH instruction is successful. Operation is also explained with reference to FIG. 1A—1C. Assuming for illustration only that there are five rows in the buffer, processing of the instructions of FIG. 5 are seen on a cycle by cycle basis in FIG. 5A. It is to be emphasized that the invention is independent of the number of rows in the buffer 2. Assume that at cycle 1 the contents of the buffer rows are as shown. At A-time of cycle 1, OP$\alpha$1 is decoded and found not to be a branch instruction. Therefore, regardless of the bits indicated by fields I and J, no signal will appear on line 65 since all inputs 42 to the function generator are deactivated. Branch State Flip-Flop 64, set to zero as an initial condition, remains in its zero state. Also at A-time, the contents of IAR 86 are incremented by one and the result is set into register 92. Validity Tag Flip-Flop 106 is also set to its zero state at A-time deactivating line 107. Also at A-time, the K-field in Row 0 will select the contents of an X-register and the contents of the H-register are sent to the adder 52 where addition takes place and the sum sent to register 54. If the instruction in Row 0 were a BRANCH, the contents in register would be a possible EBA. In the present example, the instruction in Row 0 is not a branch so that the contents of register 54 are meaningless and will not be used.

At B-time of cycle 1, AND 66 is sampled but line 68 remains inactive since line 79 is not active. Therefore line 75 remains active. Gate 82 is also sampled at B-time. Since there is no EXIT outstanding in the buffer at this time, so that the situation of row (*a*) of table V obtains. Hence, the NSA is to be sent at C-time of cycle 1. This can be seen by the fact that at B-time, line 15 is deactivated (No Exit Outstanding). Therefore, line 96 is activated which causes Tag Validity Flip-Flop 106 to be set to its one state via OR gates 94 and 105. Also line 100 causes the NSA to be gated from Register 92 to IAR 86.

At C-time of cycle 1, the NSA now in IAR 86 is gated over bus 113. Since 106 is in its one state, tag 111 is active to validate this address to the instruction fetch mechanism. Also at C-time of cycle 1, the buffer is shifted down one row and a new instruction enters row 4. The contents of the buffer are now as seen in cycle 2 of FIG. 5A. This action continues in a similar manner, subtime by subtime until C-time of cycle 3 when the BRANCH is shifted into row 0 of the buffer. Since there is still no EXIT outstanding as seen in Cycle 4 of FIG. 5A, the NSA will be sent at C-time of cycle 4 as follows. It is assumed for this illustration that the indicated branch condition is successful. Therefore, the function of the bits selected from the C-register is calculated as true in the function generator and line 67 sets Function Result Flip-Flop 165 to its one state during A-time of cycle 4. The EBA is calculated and set into Register 54. At B-time of cycle 4, AND 66 is sampled. Since lines 69, 71 and 79 are each active, line 68 is activated to gate the calculated EBA to EBA Register 74. Also at B-time, gate 82 is sampled. Since line 15 is not active, line 96 will cause Validity Tag Flip-Flop 106 to be set to its one state via OR gates 94 and 105. The incremented address (the NSA) is gated via gate 102 and OR 103 to IAR 86 from whence it is gated at C-time of Cycle 4 to the instruction fetch mechanism along with activated Validity Tag 111. Also at C-time, each row of the buffer is shifted down one and a new instruction is entered into row 4.

At the beginning of cycle 5, the contents of the buffer are as shown in FIG. 5A. The instruction entered at C-time of cycle 4 was the EXIT seen in FIG. 5. Therefore row (*b*) of Table V obtains and the EBA which was stored in EBA register 74 on the cycle when the BRANCH was determined successful will be gated to the instruction fetch mechanism. This is seen as follows. At A-time of cycle 5, Validity Tag Flip-Flop 106 is set to its zero state. Also the contents of IAR 86 are incremented and stored in Register 92. At B-time of cycle 5, AND 66 is sampled but line 68 will remain inactive since line 69 was deactivated during C-time of the previous cycle due to Branch State Flip-Flop 64 being set to 1 through delay 78 at that time. Also at B-time, gate 82 is sampled. Since the EXIT is now in row 4, the EXIT Outstanding line 15 activates one input of AND 80. Also, since Branch State Flip-Flop 64 was set to its one state as seen above, line 83 to AND 80 is active. Finally, since EBA Requested Flip-Flop 132 is in its zero state line 133 to AND 80 is active. Therefore, all inputs to AND 80 are satisfied and line 85 gates the EBA into IAR register 86 via gate 84 and OR 103. Also, line 87 sets Validity Tag Flip-Flop 106 to its one state via OR gate 105. Line 87 will also cause line 112 to reset EBA Requested Flip-Flop 132 to its one state at C-time to assure that the EBA is gated to register 86 only once and not continually. Further, activation of line 85 causes line 114 to set flip-flop 128 to its one state. Line 129 therefore serves as one enabling input to AND 130, to be discussed subsequently. At C-time of cycle 5, the EBA will be sent to the instruction fetch mechanism via bus 113 along with activated validity tag 111. Thus, the next instruction ordered will be the target instruction OPβ1 from the EBA.

However, there will be transit delay of one or more cycles between the time OPβ1 is ordered and the time it actually arrives in row 4. Therefore other instructions ordered prior to OPβ1 will appear in the buffer between the EXIT and OPβ1. Since these represent instructions in the original branched-from sequence which are not to be processed (see, for example, OPα8, OPα9, OPα10 of FIG. 5), these instructions will be inhibited so that the next instruction to be processed after the EXIT will be OPβ1. This is seen in the present embodiment as follows.

At C-time of cycle 5, each instruction in the buffer is shifted down one row and OPα8 is entered in the top row (here row 4) of the buffer. OPβ1 is still in transit. OPα4 is processed during cycle 5. At A-time of cycle 6 the contents of the buffer are as seen in FIG. 5A. Action continues with each instruction which enters row 0 being processed. On cycle 9, the EXIT is in row 0 and is processed. Since the EXIT follows a successful BRANCH (cycle 4), the next instruction to be processed after the EXIT will be the target instruction OPβ1. Therefore, the instructions in the buffer or in transit between the EXIT and OPβ1 must be ignored. This is done in the present illustration during cycles 10, 11 and 12 as follows. Line 129 was activated during cycle 5 as explained above. During A-time of cycle 9, as seen in FIG. 5A and FIG. 1A, the EXIT instruction is in row 0 and therefore flip-flop 36 is set to one. Line 73 serves, along with line 129, to enable AND 130 so as to set the one side of Inhibit Flip-Flop 126 to inhibit the processing of instructions between the exit and the target. This occurs during cycles 10, 11 and 12 so that OPα8, OPα9 and OPα10 are inhibited. During cycle 12, the target instruction OPβ1 reaches row 1 where the Target Instruction Bit causes line 123 to reset flip-flops 126 and 128 at C-time to disable the inhibit line and allow the processing of OPβ1 on cycle 13. Operation continues with the NSA being sent each cycle from the new branched-to instruction sequence and the branch is complete.

A second example of operation is seen with reference to FIGS. 1A—1C and FIGS. 6 and 6A. As we begin explanation of operation, it can be assumed that the instructions in the buffers are as shown in cycle 1 of 10A, having been shifted down at C-time of the previous cycle. It is further assumed that the machine is not in its branch state so that the branch in FIG. 6 is the first branch encountered. Therefore, Branch State Flip-Flop 64 will be set to zero, either having been set to zero at the initiation of instruction processing (310), for example as in row (*d*) of Table V, or by a previous exit instruction over line 73. At A-time of Cycle 1, the instruction in row 0 is decoded in instruction decoder 40 and found to be not a branch instruction. Also at A-time, the contents of the IAR register 86 are incremented and the sum placed in register 92. At B-time, AND gate 66 is sampled but since line 79 is inactive, the present instruction not being a branch, line 68 remains inactive and the sum calculated in adder 52 at A-time will not be gated to EBA register 74 to be used as an EBA. Also at B-time, gate 82 is sampled. Since there is both an exit and a branch outstanding in the buffer, lines 15 and 17 will be active. Also, since the branch has not yet reached row 0, the machine is not in its branch state so Branch State Flip-Flop 64, as mentioned above, is set to its zero state. Therefore, line 81 is active. This situation corresponds to row (*d*) of Table V. This is the wait stage wherein the instruction fetch mechanism waits to determine the outcome of the branch (or branches) known to be present along with an exit in the buffer. This can be seen inasmuch as Tag Validity Flip-Flop 106 cannot be set through any path dependent on line 87, 99 or 96, due to the condition of lines 15, 17, 81 and 83. Line 107 is inactive and at C-time, although a pulse will open gates 108 and 110 and the previous instruction address still resident in IAR 86 is gated on line 113, line 111 is, however, inactive, and the address from IAR 86 will be ignored by the storage system. It can be assumed, for this example that there is a one cycle delay between the storage system and the buffer. Therefore, instruction OPα4 will have been previously ordered and at C-time when the buffer shifts down one instruction OPα4 will be entered into the top row of the buffer. The contents of the buffer are as seen in cycle 2 of FIG. 6A. At A-time of cycle 2, the branch instruction is decoded. It is to be assumed that for this illustration the branch condition is determined to be successful. The effective branch address is calculated and line 65 from the function generator resets Function Result Flip-Flop 165 to its one state which activates line 79. Also, at A-time, the previous address in IAR 86 is incremented by 1 and the result stored in register 92 but will not be gated inasmuch as gate 102 will not be activated as will subsequently be seen. At B-time AND gate 66 is sampled. Since there is a branch in row 0, and Branch State Flip-Flop 64 is still in its zero condition and line 79 is activated, AND gate 66 will activate line 68 and gate the EBA from the sum register 54 via gate 70 the EBA Register 74. Gate 82 is also sampled at B-time. Since line 15 is active (exit outstanding) and line 83 is active (Branch State Flip-Flop will not be set to 1 until C-time of this cycle in view of delay 78) and EBA Requested Flip-Flop 132, having been set to zero at instruction initiation time, activates line 133, all the conditions to AND gate 80 are satisfied. Therefore, line 85 gates the EBA from EBA Register 74 over line 72 through gate 84 and OR 103 into the IAR Register 86. Line 85 will also cause line 87 to set the Validity Tag line 107. At C-time, gates 108 and 110 will be activated and will gate the EBA from IAR 86 over gate 113. Also, since line 107 has been activated, line 111 validates the instruction fetch request and the EBA becomes the next address from which an instruction, the target instruction, is fetched. Also, at C-time, line 112 will cause EBA Requested Flip-Flop 132 to be reset to its one state thus insuring that the EBA will not be continually sent but will only be sent once and that the next instruction fetch request will come from the NSA determined by incrementing the EBA by one. At C-time of the cycle 2, the buffer is shifted down but inasmuch as no instruction was ordered at C-time of cycle 1, no instruction is entered in the buffer. This is seen under cycle 3 of FIG. 6A. Operation continues, with the situation now reverting to that seen in (*b*) of Table V with the NSA each cycle being calculated and the instruction fetched from the new instruction stream. The EXIT instruction is processed during cycle 5 and at C-time of cycle 5, the exit is shifted out of row 0 and the contents of the buffer are as seen under cycle 6 of FIG. 6A. It is required to inhibit all instructions between the exit and the target instruction OPβ1. This is done as was seen in the previous example with the shifting of the exit into row 0 causing flip-flop 36 to be set to its one state and thereby causing line 73 to condition AND 130. Since flip-flop 128 was set to its one state, when conditions for AND 80 were satisfied, line 129 also is activated to condition AND 130 allowing line 131 to set Inhibit Flip-Flop 126 to its one state. This therefore inhibits, via OR 122, the decoding of instructions in instruction decoder 40 during cycles 6 and 7. During C-time of cycle 7 the target instruction, OPβ10 is shifted into row 0 of the buffer. This allows line 123 to reset flip-flops 126 and 128 to their zero condition through gate 124 during C-time. Therefore during A-time of cycle 8, the new instruction OPβ10 is decoded in instruction decoder 40, instructions are processed from the new instruction sequence and the branch is complete.

A final illustration is seen relative to FIGS. 1A—1C and FIGS. 7 and 7A. This illustration will show how multiple branches in a sequence are handled. Only two branches are shown in 7A but our invention is operative for any number of branches occurring previous to an exit instruction. In the present instruction, branch 1 is tested and if its condition is successful, the exit will be taken. In the interim between BRANCH 1 and the EXIT instruction, BRANCH 2 will be ignored if BRANCH 1 was successful. On the other hand, if BRANCH 1 was not successful, BRANCH 2 will be tested and if successful, the EXIT will be taken. For the present example, it will be assumed that BRANCH 1 is successful and BRANCH 2 will therefore be ignored whether or not its condition determination was successful. We will start our illustration with the contents of the buffer as seen under cycle 1 of FIG. 7A, the contents having been shifted down one row during C-time of the previous cycle. Since there is no exit outstanding the situation in (*a*) of Table V indicates that the next sequential address will be sent at C-time of cycle 1. It is assumed for purposes of illustration that the cycle transit delay between the storage system and the buffer is one cycle. Therefore at C-time of cycle 1, the buffer will shift down one row and OPα4 will be entered into the top row, this latter instruction having been ordered at C-time of the cycle previous to cycle 1. The contents of the buffer are now as seen under cycle 2. Branch 1 is decoded and found to be successful. Therefore at C-time of cycle 2 Branch State Flip-Flop 64 is set to one and line 77 becomes active. However, previous to this, at B-time of cycle 2, gate 82 is sampled. Since there is no exit outstanding, line 15 will be inactive and we have the situation of row (*a*) of Table V. Therefore, the NSA will be sent at C-time of the cycle 2, said NSA being a location at which OPα5 is located. Also, at C-time of cycle 2, the contents of the buffer shift down one row and the exit instruction, having been ordered at C-time of cycle 1, arrives at the top row of the buffer. The contents of the buffer are as seen under 3 in FIG. 7A. During cycle 3, the instruction OPα2 is processed. At B-time, since there is now an exit outstanding and the Branch State Flip-Flop is in its one condition, the situation of row (*b*) of the above table obtains. Therefore, the EBA is sent at C-time of cycle 3. Also at C-time of cycle 3, the contents of the buffer shift down one row and instruction OPα5 enters into the top of the buffer, having been ordered at C-time of cycle 2. During cycle 4, instruction OPα3 is processed from row 0. During C-time of cycle 4, the NSA, comprising the incremented EBA will be sent to the storage system. This is done by the activation of gate 274 at B-time which causes line 276 to activate line 107 and also gate the incremented address via gate 102 to the IAR 86 so that this address is validly sent at C-time of cycle 4 to order the next instruction after the target instruction, OPβ2 in the present example. During cycle 5 the contents of the buffer are as seen under 5 of FIG. 7A. At A-time of that cycle, flip-flop 38 will be set to 1. Inasmuch as Branch State Flip-Flop 64 was set to one by the successful resolution of the condition of BRANCH 1, AND gate 120 will allow the inhibit line to inhibit the decoding and processing of instruction BRANCH 2. This is one manner in which a branch instruction subsequent to a successful branch but before the exit instruction is ignored. At C-time of cycle 5 the incremented address will be gated again by virtue of line 276. The contents of the buffer at the beginning of cycle 6 are as shown. At B-time of cycle 6, line 276 causes the incremented address to be gated to IAR 86 through gate 102 and OR 103, and also causes Validity Tag Flip-Flop 106 to be set to its one state. Therefore the next sequential address is sent to this system. Action continues as in previous examples. After the exit passes out of row 0 at C-time of cycle 7, it is necessary to inhibit the processing of instruction OPα5 inasmuch as this instruction got into the top of the buffer by virtue of being in transit before the resolution of the condition contained in BRANCH 1 was successfully resolved. This is done again by virtue of the one side of Inhibit Flip-Flop 126 again acting as an inhibit line to the decoding of the instruction via OR 122. At C-time of cycle 8, the Target Bit in the Target instruction in Row 1 sets 126 and 128 to zero. The contents of the buffer are then shifted down one row, and the target instruction OPβ1 is now in row 0. The instruction decoder 40 is ready, at A-time of cycle 9 to begin the decoding of the target instruction and instruction processing continues down the new instruction stream.

While the invention has been particularly shown and described with reference to a preferred embodiment thereof, it will be understood by those skilled in the art that the foregoing and other changes in form and details may be made therein without departing from the spirit and scope of the invention.

We claim:

1. Apparatus in a digital computer for altering the sequence of instructions to be processed from a first instruction sequence to a second instruction sequence comprising, in combination:
   - storage means for temporarily storing instructions transmitted in sequence from a storage system, said instructions including at least one branch instruction containing an operation code, and condition and address parameters, said at least one branch instruction indicating that the instruction sequence is to be altered from said first sequence to said second sequence upon the determination of a machine condition;
   - means, coupled to said storage means and responsive to said address parameters, for determining a storage system address containing the first instruction in said second sequence;
   - means, coupled to said storage means and responsive to said operation code and to said condition parameters, for detecting the occurrence of said machine condition;
   - means, coupled to said storage means, for detecting an exit instruction subsequent in said sequence to said at least one branch instruction and separated therefrom by other instructions, said exit instruction indicating the point in said first sequence at which processing of said second sequence of instructions is to begin;
   - means, responsive to said detection of the occurrence of said machine condition, for ordering instructions to be transmitted from said storage system to said storage means, beginning at said address containing said first instruction in said second sequence while said other instructions separating said at least one branch instruction from said exit instruction are being processed, such that said first instruction is processed at said point indicated by said exit instruction.

2. Apparatus in a digital computer for altering the sequence of instructions to be processed from a first sequence to the second sequence, comprising, in combination:
   - means for detecting at least one branch instruction indicative that a branch is to be taken upon determination of a given condition;
   - means for detecting a marker instruction subsequent to said at least one branch instruction, said marker instruction indicating the point of departure from said first sequence to said second sequence if said condition has been detected;
   - means for determining a storage address containing the first instruction of said second sequence;
   - storage means for storing information indicative of various digital computer machine conditions;
   - means responsive to information contained within said at least one branch instruction for selecting predetermined information from said storage means;
   - means for comparing said selected information with information indicative of the condition indicated in said at least one branch instruction;
   - means for providing, when said comparison is successful, an indication that said branch is to be taken;

means responsive to said indication for ordering instructions, beginning at said first instruction of said second sequence, while continuing to process instructions between said at least one branch instruction and said marker instruction;

means for inhibiting the processing of branch instructions between a branch instruction for which said comparison is successful and said marker instruction; and, means responsive to the processing of said marker instruction for allowing the processing of said ordered instructions from said second sequence beginning with said first instruction thereof.

3. The combination according to claim 2 further including:

means for providing, when said comparison is unsuccessful, an indication of the fact that said branch is not to be taken; and means responsive to said last-named indication and to the detection of said marker instruction for continuing the ordering of instructions to be processed, from said first instruction sequence.

4. The combination of claim 3 wherein said conditions comprise more than one bit of information in said information storage means.

5. In a digital computer wherein instructions are prefetched from a storage system in advance of the time at which they are processed, a combination of:

first storage means for storing said prefetched instructions;

means for sending to said storage system the address of the next instruction to be prefetched;

means for decoding at least one branch instruction in a first sequence of instructions, said branch instruction containing information indicative of the fact that a branch is to be taken subsequent to the detection of a given machine condition;

second storage means for storing bits of information indicative of actual machine conditions;

means responsive to the information in said at least one branch instruction for comparing said given machine condition with said actual machine conditions;

means responsive to the successful comparison of said given and actual machine conditions for providing an indication that said branch is successful;

means for detecting a marker instruction in advance of the time said marker instruction is decoded;

means responsive to said successful branch indication and to the detection of said marker instruction for causing said means for sending said prefetch address to said storage system to send said address of said first instruction of said second sequence to be processed while instructions from said first sequence are being processed; and, means responsive to the processing of said marker instruction for causing said first instruction of said second sequence to be the next instruction processed after said marker instruction.

6. The combination according to claim 5 further including means for inhibiting the processing of any branch instruction in said first instruction sequence which is located between a successful branch instruction and a marker instruction.

7. The method, in a digital computer, of branching from a first instruction sequence to a second instruction sequence, including the steps of:

decoding a branch instruction located prior to and separated from a marker instruction in said first instruction sequence, said branch instruction indicating a branch condition and said marker instruction indicating the exit point from said first sequence;

resolving said branch condition as successful or unsuccessful;

prefetching, in response to the successful resolution of said branch condition, at least the first instruction in said second sequence while continuing to process instructions in said first sequence;

processing said marker instruction; and processing, as the next instruction processed after said marker instruction, the first instruction in said second sequence.

8. The process of claim 7, further including the step of inhibiting the processing of any branch instruction of said first sequence located between the marker instruction and a branch instruction for which the branch condition has been resolved as successful.

9. The process of claim 8 further including the steps, in response to the unsuccessful resolution of said decoded branch instruction, of:

prefetching the next instruction to be prefetched from said first sequence;

processing said marker instruction; and processing, as the next instruction processed after said marker instruction, the next instruction in said first sequence after said marker instruction.

10. The method, in a digital computer, of branching from a first instruction sequence to a second instruction sequence comprising the steps of:

detecting a branch instruction indicating a machine condition after the occurrence of which said branching is to occur;

obtaining a storage address indicative of the first instruction in said second sequence;

detecting the occurrence of said indicated machine condition;

prefetching said second sequence of instructions from a storage system beginning at said storage address indicative of the first instruction in said sequence;

detecting, after said condition occurrence detection, a marker instruction in said first sequence which indicates that point at which the first instruction of said second sequence is to be processed;

processing instructions in said first sequence to the point indicated by said marker instruction concurrently with said prefetching; and processing, beginning at said indicated point, said second sequence of instructions beginning with the first instruction of said second sequence.

11. The method, in a digital computer, of branching from a first instruction sequence to a second instruction sequence comprising the steps of:

detecting a branch instruction previous to a marker instruction, said branch instruction indicating that a departure from said first instruction sequence to said second instruction sequence is to be made after the occurrence of a machine condition and said marker instruction indicating the point in said first sequence at which said departure is to be made;

obtaining the storage address of the first instruction in said second sequence;

detecting the occurrence of said machine condition;

detecting said marker instruction;

prefetching, in response to the detection of said machine condition and to the detection of said marker instruction, instructions from said second sequence beginning with said first instruction thereof;

continuing the processing of instructions in said first sequence concurrently with said instruction prefetching; and processing said instructions fetched from said second sequence after the processing of said marker instruction of said first sequence.

12. The method, in a digital computer, of branching from a first instruction sequence to a second instruction sequence comprising the steps of:

prefetching instructions from said first instruction sequence in advance of the time they are to be processed;

decoding from said prefetched instructions of said first sequence a branch instruction indicating a branch will subsequently be taken to said second instruction sequence if certain indicated machine conditions are detected;

obtaining the address of the beginning instruction in said second sequence;

testing a plurality of possible machine conditions to detect the occurrence of said indicated machine conditions;

detecting a marker instruction subsequent to said branch instruction in said first sequence, indicating the point of departure from said first sequence to said second sequence;

prefetching instructions from sequential addresses beginning with said obtained address while continuing to process instructions from said first sequence; and processing instructions beginning with said prefetched instructions from said second instruction sequence after the detection of said marker instruction.

13. The method of claim 12 further including, in response to the detection of the absence of said occurrence of said indicated machine conditions, the steps of:

continuing the prefetching of instructions from said first sequence; and processing, after the detecting of said marker instruction, said last-named prefetched instructions from said first sequence.